(No Model.)
C. G. MORTENSON.
GARDEN IMPLEMENT.
No. 529,562. Patented Nov. 20, 1894.
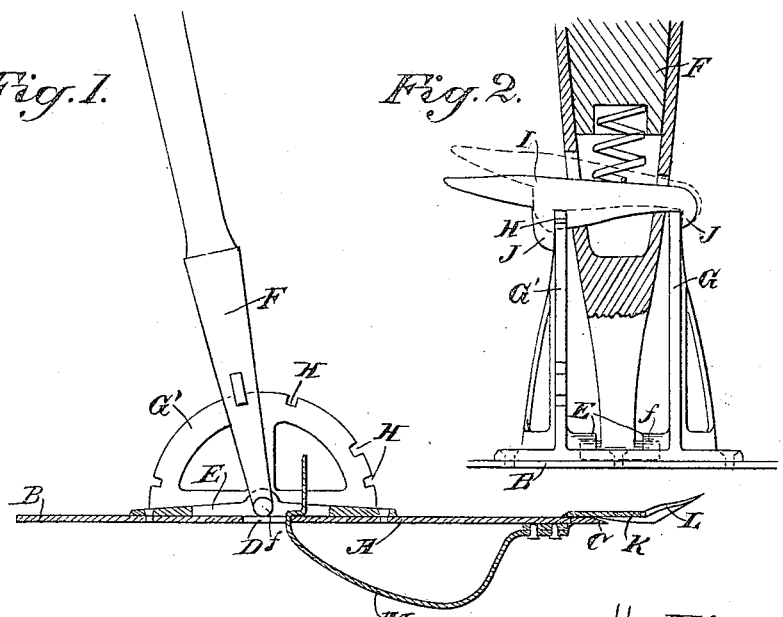
Witnesses,
Inventor,
Charles G. Mortenson

UNITED STATES PATENT OFFICE.

CHARLES G. MORTENSON, OF LORIN, CALIFORNIA.

GARDEN IMPLEMENT.

SPECIFICATION forming part of Letters Patent No. 529,562, dated November 20, 1894.

Application filed July 30, 1894. Serial No. 518,989. (No model.)

*To all whom it may concern:*

Be it known that I, CHARLES G. MORTENSON, a citizen of the United States, residing at Lorin, Alameda county, State of California, have invented an Improvement in Garden Implements; and I hereby declare the following to be a full, clear, and exact description of the same.

My invention relates to a novel implement which is especially designed for use about gardens and lawns.

It consists of a peculiarly shaped blade with a hinge joint, latch and strengthening brace, and an attachment for extracting roots and weeds, and in certain details of construction which will be more fully explained by reference to the accompanying drawings, in which—

Figure 1 is a longitudinal section through the implement and attachment. Fig. 2 is a rear view of the same. Figs. 3 and 4 show its different positions with the attachment. Fig. 5 is a detail view of the attachment. Figs. 6, 7, 8, and 9 show its different positions without the attachment.

The object of my invention is to provide a single implement which is adapted for nearly or quite all the purposes for which it is desirable about gardens and lawns, and an easy means for transforming it into either of its capacities.

A is a blade made of sheet steel having one edge B made sufficiently broad to form a broad edged spade or shovel. When this edge is presented to be used upon the ground, or when presented at another angle it may be used as what is known as a "weed or scuffle hoe." The opposite end of the blade A is tapered down to a point C so as to make a pointed spade which is well adapted for digging in small places in and around flowers, where there is but small place to work. The blade A has a hole made centrally through it as shown at D, and over it is riveted a plate E, having just above the hole, in the plate A, sockets in which the trunnions or pivot pins *f* of the handle F are adapted to fit so that the blade A may be turned around these trunnions or pivot pins to stand in any desired position with relation to the handle.

G G' are semi-circular arcs, preferably cast or formed with the plate E and standing upon each side of the tapering socket of the handle F which enters between them, and has the trunnions or pivot pins, previously described, upon its inner end, and turning upon the center about which the semi-circular arcs are formed. One of these semi-circular arcs G' has notches H made in it adapted to receive a spring-actuated latch I. This latch has two prongs or extensions J exterior to the semi-circles G, and adapted to clasp upon each side of these semi-circles so as to form a brace and steady the handle in its connection with the plate A. It will be seen that when the plate is turned with reference to the handle, as shown in dotted lines in Fig. 9, it may be employed as an ordinary broad bladed spade, using the edge B, and when turned as shown in Fig. 7 it forms a pointed spade for digging in small places, and the broad edge B serves for the foot in case it is necessary to exert any pressure for this purpose. When turned to stand in the position shown in Fig. 8 it forms a broad bladed hoe, and when turned to stand in the position, Fig. 6, it forms a pointed hoe. In the position shown in full lines in Fig. 9, it forms a weed cutter or scuffle hoe and is very useful for this purpose.

Many of the weeds about a garden are extremely difficult to eradicate on account of the long strong roots. I have, therefore, shown an attachment which consists of a tip K having a slot *k* made in it adapted to fit over the point C of the spade, and this tip has a narrow V-shaped split L made in it.

From the rear end of the tip a curved arm M extends, and has the opposite end adapted to enter the hole D in the center of the plate A where it latches itself by means of its elasticity, so that after the tip has been slipped over the point C by pressing upon this spring arm, it is entered into the hole D and caused to latch and lock itself in place. In this position the curved arm M serves as a fulcrum when the blade A is set, as shown in Fig. 4, and by causing the notch L to engage with the root of the weed, by pressing upon the handle a leverage is obtained sufficient to take the weed out of the ground at once. In some cases it may be turned to the position shown in Fig. 3 when it then serves as a weed hoe, the bifurcated point engaging the roots or stalks of the weed and pulling them out where the ground is sufficiently soft for that purpose. By this construction I provide an implement with a great variety of uses, easily adjusted, and very rigid on account of the bracing of the handle in its connection with the blade.

Having thus described my invention, what I claim as new, and desire to secure by Letters Patent, is—

1. A garden implement consisting of the flat blade having square and pointed edges at opposite ends, a fulcrum plate secured to one side between said edges to which the handle is pivoted and about which it is turnable, semi-circular arcs projecting from said plate having the pivot points as their center, and a latch adapted to engage notches upon one of the arcs and having lugs which clasp opposite sides of the arcs so as to form a brace for the handle which extends between them.

2. A garden implement consisting of a flat blade having one end made with a square edge and the other pointed, a handle pivoted to the center of the blade upon one side, semi-circular arcs fixed to the blade standing upon either side of the handle which passes between them, a spring-actuated latch connected with the handle and adapted to drop into notches in one of the arcs, said latch having lugs or clasps exterior to the arcs and adapted to engage their outer sides so as to form a brace for the handle in its connection with the blade.

3. A garden implement consisting of a flat blade having a handle fulcrumed to the center so that the blade is turnable to take different angles about its fulcrum point, and a latch and locking mechanism to hold it in its position, an attachment consisting of a bifurcated point adapted to fit the pointed end of the plate having a curved elastic arm extending toward the center and adapted to enter a hole in the central portion of the plate whereby the supplemental point is secured in place.

4. A garden implement consisting of a handle, a flat blade pointed at one end pivoted to the handle and turnable about its pivot points to occupy different positions with relation to the handle, a bracing and locking latch whereby the handle and blade are retained in position with relation to each other and a supplemental removable weed pulling attachment consisting of a bifurcated point adapted to fit the point of the implement, having a curved arm extending from its inner edge and latching in a hole in the plate, said arm forming a fulcrum to rest upon the ground when the bifurcated point has been engaged with the weed or root to be extracted whereby the handle may be employed as a lever for that purpose.

In witness whereof I have hereunto set my hand.

CHARLES G. MORTENSON.

Witnesses:
S. H. NOURSE,
H. F. ASCHECK.